United States Patent [19]

Ben-Porat

[11] 4,454,711

[45] Jun. 19, 1984

[54] SELF-ALIGNING FUEL NOZZLE ASSEMBLY

[75] Inventor: Avi Ben-Porat, Norwalk, Conn.

[73] Assignee: Avco Corporation, Stratford, Conn.

[21] Appl. No.: 316,326

[22] Filed: Oct. 29, 1981

[51] Int. Cl.³ ............................ F02C 7/20; F02G 3/00
[52] U.S. Cl. ................................... 60/39.32; 60/748; 60/39.31
[58] Field of Search ............... 60/39.31, 39.32, 740, 60/748; 239/587

[56] References Cited

U.S. PATENT DOCUMENTS

| | | | |
|---|---|---|---|
| 2,885,943 | 5/1959 | Divizia | 239/587 |
| 3,403,510 | 10/1968 | Lauck | 60/748 |
| 3,879,940 | 4/1975 | Stenger et al. | 60/740 |
| 4,261,347 | 4/1981 | Spencer et al. | 239/587 |
| 4,275,843 | 6/1981 | Moen | 239/587 |
| 4,365,470 | 12/1982 | Matthews et al. | 60/39.32 |

Primary Examiner—Louis J. Casaregola
Assistant Examiner—Timothy S. Thorpe
Attorney, Agent, or Firm—Ralph D. Gelling

[57] ABSTRACT

A self-aligning fuel nozzle assembly is provided for maintaining the alignment of a swirler member and a fuel nozzle upon displacement of the combustor liner relative to the combustor housing of a combustion chamber assembly in a turbine engine. The self-aligning fuel nozzle assembly mounts the swirler member to the combustor liner by a device having six degrees of freedom including a ball and socket joint which is placed within a structure so as to permit movement in the three main Cartesian directions of a rectangular axis system. The combustor liner is installed within the combustor housing in such manner that the fuel nozzle is slidably received within the swirler, with the swirler being biased against the fuel nozzle by a helical spring member forming part of the assembly. The self-aligning fuel nozzle assembly reduces the development of local stresses between the swirler and the fuel nozzle so that wearing between these parts is reduced. The swirler member and fuel nozzle are retained in aligned positions so that the self-aligning fuel nozzle assembly promotes improved fuel economy in the engine.

9 Claims, 6 Drawing Figures

SELF-ALIGNING FUEL NOZZLE ASSEMBLY

BACKGROUND OF THE INVENTION

The present invention relates to a device for reducing wear between relatively movable parts within the combustion chamber assembly of an aircraft engine and for promoting improved fuel consumption for the engine. More particularly, the subject invention relates to a self-aligning fuel nozzle assembly having multiple degrees of freedom so as to maintain the alignment of the swirler and the fuel nozzle, while accommodating any relative displacements of the combustor liner, which contains the swirler, with respect to a combustor housing to which the fuel nozzle is fixedly secured.

A gas turbine engine is essentially designed for the sole purpose of producing high velocity gases at a jet nozzle. These high velocity gases are produced in the engine by the ignition of a mixture of compressed air and fuel. The combustion of the fuel air mixture occurs within the combustion chamber assembly of the engine which basically includes a combustor housing and a thin metallic combustor liner disposed within the combustor housing and mounted thereto at one end in cantilevered fashion. The combustor liner includes an internal combustion chamber in which ignition of the compressed air and fuel takes place. The resulting post-combustion gases are expelled from the combustion chamber assembly, pass through the turbine, and are thence propelled through the jet nozzle to the atmosphere.

The burner section of the engine should be designed so that combustion efficiency is maintained at a high level. More particularly, there should be no tendency for the engine to burn out, nor should burning occur after the gases leave the outlet, i.e., complete combustion should occur entirely within the burner section. Presently known methods for promoting complete combustion include introducing fuel into the airstream as it enters the combustion chamber by means of the fuel nozzle. The fuel nozzle employs a pressure atomizing principle to aspirate the fuel in a manner providing a uniform distribution of fine particles of fuel. Fuel in this form is suitable for rapid mixing with the incoming air for combustion. Often a swirler is used in conjunction with the nozzle to more evenly distribute large quantities of the fuel-air mixture within the combustion chamber to promote rapid burning. In these prior art burner sections, the fuel nozzle is fixedly mounted to the combustor housing and extends through the swirler which is fixedly mounted to the combustor liner.

A problem with prior art swirler and fuel nozzle devices arises because typical burner sections are subject to rather extreme forces due to thermal displacements during operation of the engine. For example, the heat released per cubic foot of combustion space in the large turbojet engine is several thousand times as great as the heat released per cubic foot of burner space in an ordinary home-heating burner. At the same time, however, the burner section of the turbojet engine is also designed to deliver post combustion gases to the turbine at a temperature which does not exceed allowable limits. In most burner sections this is accomplished because only a small portion of the air entering the combustor housing from the compressor flows into the combustion chamber for ignition with the fuel, while a greater portion forms a cooling residual air flow at the outside of the combustor liner which tends to reduce the overall temperature of the total gases passing through the section. Large amounts of heat are released from the combustor liner to the residual air flow passing through the combustor housing, so that large thermal gradients are generated in the engine during use. In addition, the pressure within a 10,000 pound-thrust turbojet combustion chamber, which is enclosed by only a relatively thin thickness of steel wall, is approximately ten times as great as the pressure within the average industrial burner which is enclosed by very thick walls of fire brick and other materials. Further, very large noise levels are produced by the propulsion of large amounts of high velocity gases out of the jet nozzle. The latter, plus the movement of both the compressor and turbine vanes act to produce extensive vibrational effects throughout the engine. The thermal gradients, internal pressures, and vibrational forces act upon the various components within the burner section in a manner to cause displacements in their relative positions. Particularly troublesome is the fact that the thin steel wall combustor liner is very susceptible to these forces and as a result frequent displacements of the liner with respect to the combustor housing are experienced in normal operation of the engine.

In prior art burner sections, when the combustor liner moves the swirler moves. However, the fuel nozzle extending within the swirler remains stationary, resisting the movement of the swirler, so that movement of the liner causes wear in both the swirler and the fuel nozzle parts. When the fuel nozzle is damaged, fuel tends to be splattered into the combustion chamber rather than being sprayed therein in uniform droplets, thereby decreasing the uniform mixing of fuel and air, and thus inhibiting complete combustion. In prior art aircraft engines, it has been known to provide a swirler with an interior having a series of ridges. The frequent displacement of the combustor liner causes the ridges to act as a knife against the fuel nozzle and in some cases to actually shear off the spray end of the nozzle. When wearing and damage occurs in the swirler, the fuel mixture entering the chamber is less enriched with air and less evenly distributed throughout the chamber, also leading to retarded or incomplete combustion. Also observed, is the fact that sometimes the combustor liner moves away from the fuel nozzle thereby partially dislodging it from the swirler. A problem arises if the liner then moves towards the nozzle again at an angle. The latter motion could jam the nozzle within the swirler in a misaligned position, leading to a permanent displacement of the liner relative to the combustor housing. In this instance, the combustion efficiency of the engine is reduced because the air enrichment of the fuel reaching the combustor chamber is poor and large amounts of fuel are misdirected and remain unburned.

Accordingly, in order to overcome the shortcomings of prior art devices, it is an object of the subject invention to provide a device for maintaining the proper alignment of the swirler and fuel nozzle for any displacement of the combustor liner relative to the combustor housing during operation of the aircraft engine.

It is another object of the subject invention to provide a device for reducing wear of the swirler and the fuel nozzle parts during operation of the engine.

It is a further object of the subject invention to improve the fuel efficiency of an aircraft engine by providing a self-aligning fuel nozzle assembly capable of compensating for relative movement between a liner and a combustor housing in six degrees of freedom.

SUMMARY OF THE INVENTION

The new and improved self-aligning fuel nozzle assembly of the subject invention comprises a device having a plurality of degrees of freedom for mounting a swirler member within a combustor liner of a turbine engine in such manner that the swirler member and the fuel nozzle remain in an aligned position throughout various displacements of the combustor liner relative to the combustor housing during operation of the engine. The plurality of degrees of freedom are provided in the subject assembly by combining a ball and socket joint within a structure permitting displacement along the three main Cartesian directions of the rectangular axis system.

As is well known, in a combustion chamber assembly a fuel nozzle is mounted on the combustor housing and extends into the combustion chamber formed by a combustor liner. A swirler element surrounds the nozzle and extends into the interior of the combustion chamber through an entrance opening in the combustor liner. The new and improved self-aligning fuel nozzle assembly of the subject invention comprises a swirler and socket housing assembly which includes a swirler member having a spherical ball portion extending from one end thereof. The ball portion is retained within an elongated socket housing having a complementary socket defined by its radially interior surface. Inner and outer mounting plates are disposed on either side of the combustor liner at the entrance opening and extend radially inward to form an annular slot between them. Each of the mounting plates has a central aperture therein, and the plates are fixed to the liner with their apertures in register. A tubular sleeve member is inserted through the apertures of the mounting plates, and includes a radially outward extending flange or lip portion having a diameter greater than the diameter of the registered apertures in the mounting plates. The flange is disposed in the annular slot formed between the inner and outer mounting plates such that the plates slidably retain the sleeve member in a manner permitting transverse motion of the sleeve member in the plane defined by the flange. The interior of the tubular sleeve member is adapted to slidably receive the swirler and socket housing assembly, with the socket housing extending through the sleeve member. A retention member, connected to the exterior end of the socket housing retains the swirler and socket housing assembly within the sleeve member at the entrance of the combustion chamber of the engine. An elongated fuel nozzle having an intermediate step portion is secured to the combustor housing of the engine, and slidably extends into the swirler member such that the swirler member rests against the step portion of the fuel nozzle. A spring biases the swirler member against the stepped portion of the fuel nozzle.

During operation of the turbine engine, any excursions of the combustor liner with respect to the combustor housing are accommodated by the new and improved self-aligning assembly of the subject invention without altering the aligned engagement of the fuel nozzle and the swirler, thereby reducing wear of the swirler and fuel nozzle parts, and promoting improved fuel economy for the engine.

Further objects and advantages of the subject invention will become apparent from a reading of the following detailed description taken in conjunction with the drawings in which:

DETAILED DESCRIPTION OF THE PREFERRED EMBODIMENTS

Figure 1:
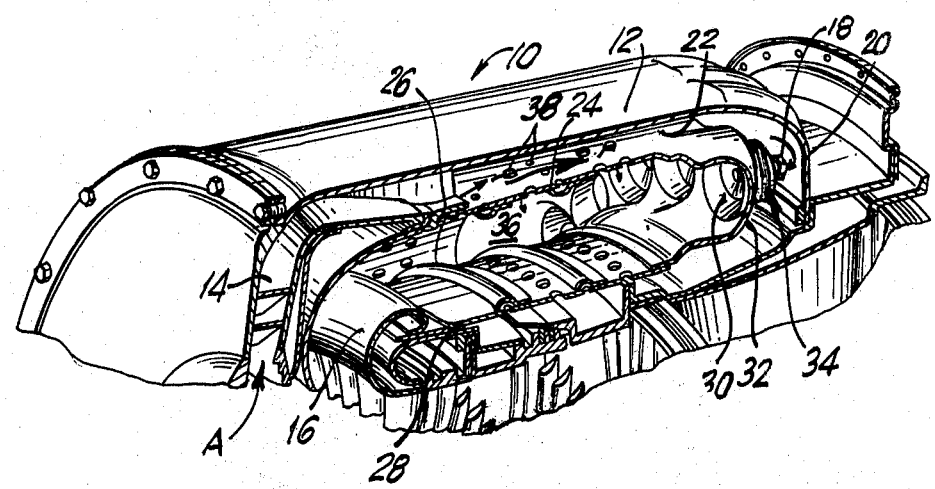
FIG. 1 is a perspective view of a combustor section of a turbine engine having the new and improved self-aligning fuel nozzle assembly of the subject invention installed therein.

Referring to FIG. 1, the combustion chamber assembly of a gas turbine engine is generally designated by the numeral 10 and includes combustor housing 12 disposed between the compressor/diffuser outlet 14 and the turbine inlet 16. A combustor liner 24 is constructed to form an interior combustion chamber 36 and is disposed wholly within enclosure 22. The combustor liner 24 is mounted in a cantilever fashion at the forward end of assembly 10, at its upper side to the compressor/diffuser outlet ducting at point 26, and at its lower side to combustor housing 12 at point 28. An entrance to the combustion chamber 36 is formed by an opening in the combustor liner 24 and a swirler assembly 34 is disposed within the entrance. A fuel nozzle 18 is mounted at one end wall 20 of the combustor housing 12, such that it extends within the enclosure 22 defined by combustor housing 12 and engages the swirler 30.

The new and improved self-aligning fuel nozzle assembly 34 is disposed within combustor liner 24 and includes swirler 30 having a ball portion 44, socket housing 50 constructed to receive ball portion 44, tubular sleeve element 86 having a flange 90, and inner and outer plates 74 and 76 which form an annular slot to receive flange 90.

The interior of combustor liner 24 defines the combustion chamber 36 where ignition of the fuel-compressed air mixture occurs. Incoming compressed air A flows from the compressor/diffuser section via outlet 14 into the enclosure 22 defined by combustor housing 12. The compressed air A surrounds combustor liner 24 and enters combustion chamber 36 at the opposed end 32 of combustor liner 24 and thence flows past the fuel nozzle 18. Fuel nozzle 18 mixes the compressed air with fine particles of fuel and directs the fuel air mixture through swirler member 30 to uniformly distribute the mixture within the combustion chamber 36. Compressed air A also enters combustion chamber 36 through side openings 38 within the walls of combustor liner 24. After the fuel air mixture is ignited, the post combustion gases exit the combustion chamber 36 via turbine inlet 16.

Figure 3:
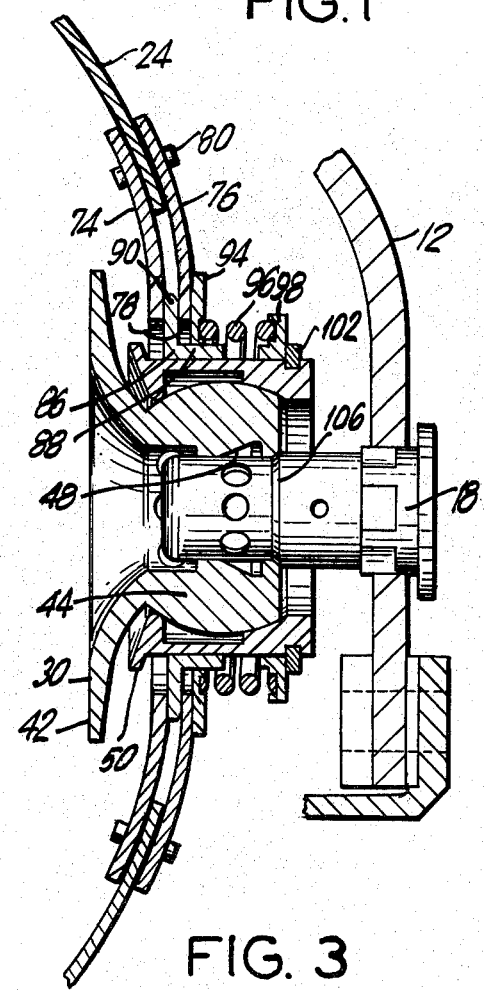
FIG. 3 is an elevational, cross-sectional view of the new and improved self-aligning fuel nozzle assembly in its assembled form.
Figure 2:
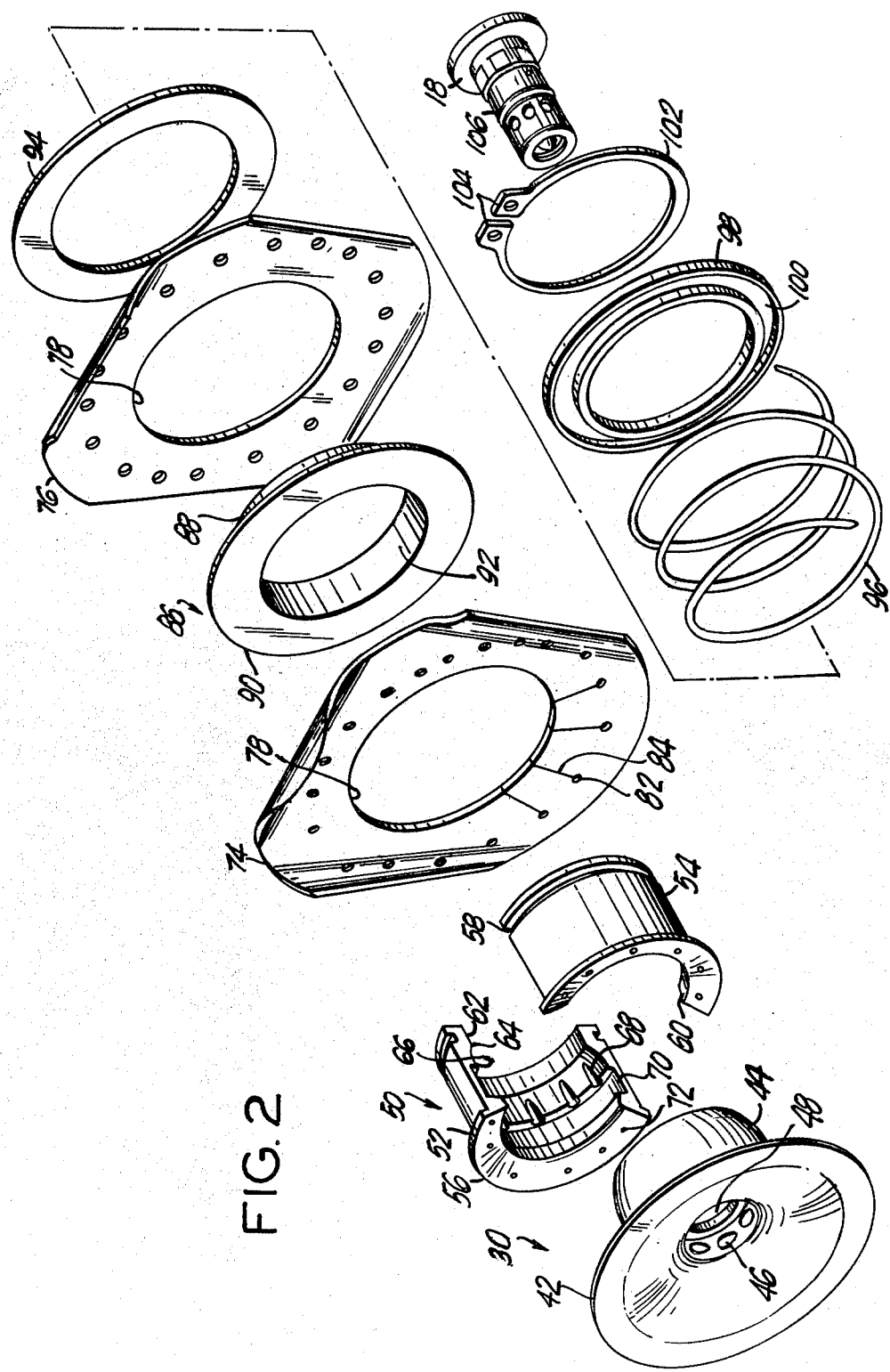
FIG. 2 is an exploded perspective view of the new and improved self-aligning fuel nozzle of the subject invention.

Referring now to FIG. 1, 2, and 3, the new and improved self-aligning fuel nozzle assembly 34 of the subject invention comprises a plurality of components including swirler member 30. Swirler member 30 includes a radially extending swirler portion 42 extending from one end and a spherical ball portion 44 extending from the opposed end thereof. A plurality of circumferentially spaced apertures 46 are disposed in swirler member 30 at a point between swirler portion 42 and ball portion 44. In addition, swirler member 30 includes a longitudinally extending aperture 48 for slidably receiving the fuel nozzle 18.

Self-aligning fuel nozzle assembly 34 also includes a tubular socket housing 50 designed to receive the ball portion 44 of swirler member 30. Socket housing 50 includes an anterior end 52 and a distal end 54, with the socket housing 50 being generally cylindrical. A radially extending edge 56 extends from the anterior end 52, while a generally rectangular groove 58 is disposed adjacent the distal end 54. Tubular socket housing 50 further includes a longitudinally extending internal opening 60 of irregular cross section. Internal opening 60 includes a first section 62 having a constant diameter extending from distal end 54 to a point 64 intermediate the length of socket housing 50. A spheroidal section 66 extends from intermediate point 64 to the anterior end 52 of socket housing 50 and defines a socket member for slidably receiving the ball portion 44 to form a ball and socket joint between the swirler member 30 and socket housing 50. Spheroidal section 66 further includes circumferentially spaced longitudinal grooves 68 which communicate with a rectangular recessed area 70. A plurality of longitudinally extending, circumferentially spaced apertures 72 extend between recessed area 70 and radially extending edge 56. Apertures 72 are arranged in alignment with grooves 68 to permit the passage of cool air through the grooves 68, into the recessed area 70 and out through peripheral apertures 72 for aiding in cooling of the swirler member 30. The cool air flowing from peripheral apertures 72 acts to cool swirler portion 42 from the base, along the flange to the outer edges of swirler portion 42. The cool air flow through the housing 50 is also effective to inhibit cracking of the swirler.

As depicted in FIG. 2, tubular socket housing 50 is preferably formed of a pair of mirror image parts in order to facilitate the engagement and assembly of ball portion 44 therein.

Self-aligning fuel nozzle assembly 34 also includes first and second mounting plates 74 and 76, respectively, which are disposed at the respective inner and outer surfaces of combustor liner 24. Both first mounting plate 74 and second mounting plate 76 contain centrally located apertures 78, 78. First mounting plate 74 is secured to second mounting plate 76 with their respective apertures in register, by rivets 80 in the preferred embodiment depicted in FIG. 3, although a welded connection may be used. Further, first and second mounting plates 74 and 76 respectively, preferably include circumferentially spaced apertures 82 which communicate with central apertures 78 by means of radial slits 84, as shown in FIG. 2, for passage of cooling air to the hotter parts of the swirler which are in the bottom side of the swirler.

A sleeve member 86 including elongated cylindridal portion 88 having a cross sectional diameter smaller than the cross sectional diameter of the apertures 78, 78 in the first and second mounting plates 74 and 76 respectively, extends through aperture 78 in second mounting plate 76. Sleeve member 86 also includes a radially extending lip portion 90 extending from one end thereof which has a cross sectional diameter larger than an aperture 78, 78, in the first and second mounting plates 74 and 76. Lip portion 90 is disposed intermediate and in slidable relation to the first and second mounting plates 74 and 76 such that the latter retain sleeve member 86 in a manner permitting freedom of motion of sleeve member 86 in two orthagonal directions in the plane defined intermediate the first and second mounting plates 74 and 76. Sleeve member 86 further includes a longitudinally extending aperture 92 which is adapted to slidably receive tubular socket housing 50. The distal end 54 of socket housing 50 extends through cylindrical portion 88. Although the preferred embodiment described herein includes two mounting plates disposed on opposite surfaces of the combustor liner 24, with the lip portion 90 of sleeve member 86 slidably disposed therebetween, an equivalent construction which allows the above mentioned two degrees of freedom of movement of the sleeve member may also be employed. For example, the combustor liner 24 itself could be reinforced so that only one mounting plate need be mounted thereto to define a structure for slidably retaining sleeve member 86, or two plates may be bonded to each other and mounted to one surface of the combustor liner 24.

Self-aligning fuel nozzle assembly 32 additionally includes a washer 94 disposed adjacent second mounting plate 76. Washer 94 is of a size such that the elongated cylindrical portion 88 of sleeve member 86 extends through its central opening. One end of a helical spring 96 is disposed in a peripheral channel in washer 94, while the other end of the spring 96 bears against a spring retainer 98. The latter includes a peripheral channel portion 100 disposed at one side thereof for receiving the helical spring 96. The distal end 54 of socket housing 50 also extends centrally through the spring retaining member 98, and a split spring washer 102 is disposed within the rectangular groove 58 at the distal end 54 of socket housing 50. When assembled, spring washer 102 secures the two mirror image parts of socket housing 50 together. In addition, spring washer 102 includes two tab portions 104, 104 which are operative to retain the socket housing 50 in the sleeve member 86 thereby retaining the various components of self-aligning fuel nozzle assembly 34 as a single unit mounted to combustor liner 24.

The new and improved fuel nozzle assembly 34 is shown fully assembled position in FIG. 3. As illustrated therein, swirler member 30 is slidably engaged within socket housing 50 which in turn is slidably engaged within sleeve member 86. The latter is slidably retained by first and second mounting plates 74 and 76, with radially extending lip portion 90 disposed therebetween. The combustor liner 24 is mounted within the combustor housing 12 such that the fuel nozzle 18 extends within the aperture 48 of the swirler member 30. Fuel nozzle 18 has an intermediate step portion 106 which is of greater diameter than aperture 48. The arrangement of aperture 48 and step 106 is operative to limit the extent of insertion of the fuel nozzle 18 within the swirler member 30. Further, the combustor liner 24 is installed in such manner that the swirler member 30 is biased against step portion 106 of fuel nozzle 18 by means of helical spring 94. The new and improved self-aligning fuel nozzle assembly 34 of the subject invention is operative to maintain the alignment of swirler member 30 and fuel nozzle 18 throughout the full range of differential displacements or relative movement of the combustor liner 24, relative to the combustor housing during operation of the engine. Combustor liner 24 is made of thin steel and displacements of the liner may occur because of the thermal expansions and/or vibrational forces resulting from operation of the engine.

Figure 4:
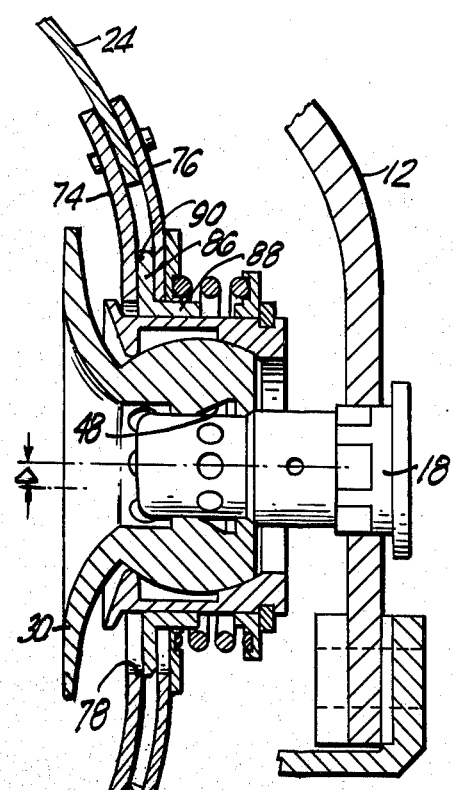
FIG. 4 is an elevational view, in cross-section, of the new and improved self-aligning fuel nozzle assembly and showing a radial displacement of the combustor liner relative to the combustor housing.

FIG. 4 illustrates the accommodation of a radial displacement ("Δ") of the liner 24 by the self-aligning assembly 34 of the subject invention. The accommodation of such radial motions is made possible by the slidable engagement of the sleeve member 86 between the first and second mounting plates 74 and 76, which extend from the liner 24. The condition depicted in FIG. 4 is one wherein the combustor liner 24 has moved downwardly relative to combustor housing 12. As described above, the elongated cylindrical portion 88 of the sleeve member 86 has a cross sectional diameter smaller than that of the central aperture 78 in second mounting plate 76 through which it extends. With the centers of elongated, cylindrical portion 88 and aperture 78 in a concentric position, the magnitude of radial displacements which may be accommodated by the new and improved assembly 34 of the subject invention is equal to the difference between their respective radii. In other words, either the sleeve member 86 is free to move within the first and second mounting plates 74 and 76, or the combustor liner 24 is free to move relative to the sleeve member until the elongated cylindrical portion 88 comes in contact or abuts a side of aperture 78 within second mounting plate 76. The mounting of combustor liner 24 within combustor housing 12 whereby the swirler member 30 is spring biased against fuel nozzle 18 is sufficient to retain the swirler member 30 and the fuel nozzle 18 in alignment so that when a radial displacement of the combustor liner 24 occurs, sleeve member 88 remains stationary while the liner 24 shifts around it. As shown in FIG. 4 the liner 24 has moved downward so that the top side of elongated, cylindrical portion 88 is abutting the top side of aperture 78 in second mounting plate 76, while at bottom sides thereof the distance between cylindrical portion 88 and aperture 78 has increased when compared with their respective positions as shown in FIG. 3. The magnitude of radial displacements of the liner which may be accommodated by the self-aligning fuel nozzle assembly 34 can be adjusted so that it is greater than or equal to any observed radial displacement in an engine by simply adjusting the relative cross-sectional diameters of the cylindrical portion 88 of sleeve member 86 and of the central aperture 78 in the second mounting plate 76.

Figure 5:
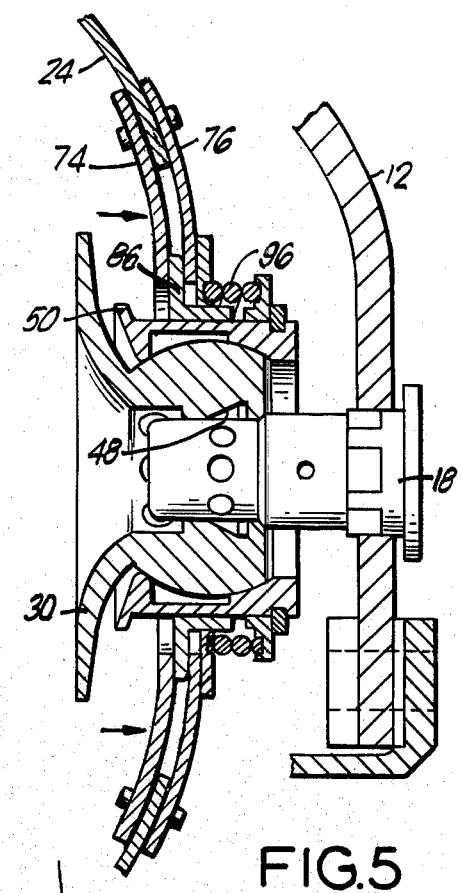
FIG. 5 is an elevational view, in cross-section, of the new and improved self-aligning fuel nozzle assembly and showing an axial displacement of the combustor liner relative to the combustor housing.

FIG. 5 illustrates axial displacement of the combustor liner 24 relative to the housing. As indicated by the arrows, combustor liner 24 has moved towards fuel nozzle 18. The self-aligning fuel nozzle assembly 34 accommodates this movement through the sliding of socket housing 50 within sleeve member 86. As combustor liner 24 moves toward the end wall 20 of combustor housing 12, sleeve member 86 slides forward around tubular socket housing 50, with such movement resulting in compression of helical spring 96. Fuel nozzle 18 and the swirler member 30 remain engaged during the displacement of the combustor liner 24. In the event combustor liner 24 is displaced in the opposite direction, i.e., away from end wall 20 and the fuel nozzle 18, the helical spring 96 will expand thereby drawing socket housing 50 through sleeve member 86 towards the fuel nozzle 18 such that swirler member 30 and fuel nozzle 18 remain engaged and aligned during an axial displacement in this direction also.

Figure 6:
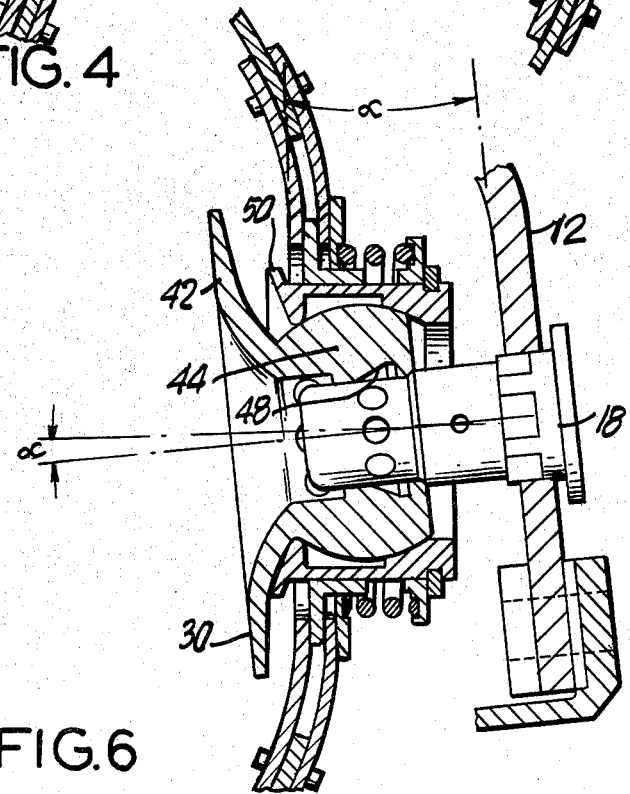
FIG. 6 is an elevational view, in cross-section of the new and improved self-aligning fuel nozzle assembly and showing a rotational displacement of the combustor liner relative to the combustor housing.

Referring to FIG. 6, a rotational displacement ("α") of combustor liner 24 relative to fuel nozzle 18 is depicted. Rotational displacements of the combustor liner 24 are accommodated within the new and improved self-aligning fuel nozzle assembly 34 by means of the ball and socket joint between swirler member 30 and socket housing 50. When a rotational displacement of the combustor liner 24 occurs, the swirler member 30 remains biased against the fuel nozzle 18 in its aligned position, while socket housing 50 rotates around the ball portion 44 of swirler member 30.

The plurality of degrees of freedom provided by the new and improved self-aligning fuel nozzle assembly accommodate displacements of the combustor liner relative to the housing, while maintaining the alignment of the swirler member and the fuel nozzle. For example, if a rotational excursion of the liner occurs, part of the compensation for such movement within the self-aligning assembly will be provided by the degrees of freedom in the radial directions and axial directions. Hence, the self-aligning fuel nozzle assembly of the subject invention reduces the development of local stresses between the swirler member and the fuel nozzle thereby minimizing wear and consequent failure of these parts. The subject self-aligning fuel nozzle assembly, by maintaining the alignment of the swirler member and the fuel nozzle, ensures a well distributed and highly enriched fuel air mixture within the combustion chamber thereby promoting increased fuel efficiency for the engine.

While the subject invention has been described with reference to a preferred embodiment it is apparent that various modifications, alterations and changes may be made therein by one skilled in the art without departing from the scope and spirit of the subject invention as defined by the appended claims.

What is claimed is:

1. A self-aligning fuel nozzle assembly mounted within the entrance opening in the combustor liner of a combustion chamber assembly of a gas turbine engine for maintaining alignment of a swirler and a fuel nozzle throughout changes in the relative position of the combustor liner and the combustor housing during operation of the engine comprising:

inner and outer mounting plates disposed on either side of the combustor liner and extending radially into said entrance opening leading to the combustion chamber to form an annular slot between said plates; each of said plates having a centrally located, axially aligned, aperture;

a sleeve member including an elongated cylindrical portion mounted in the aligned apertures of the mounting plates and having a radially extending lip portion adapted to slidably engage the annular slot formed between the mounting plates to retain said sleeve member in a manner permitting motion of the sleeve member in the plane of said flange, said sleeve member being constructed with a longitudinally extending aperture;

a tubular socket housing mounted for axial movement within the aperture of the sleeve member and having a longitudinally extending interior opening defining a spherical socket;

retention means extending radially outward from the distal end of the socket housing to limit sliding motion thereof and retain said socket housing within the sleeve member, said retention means comprising:

a washer disposed adjacent to said second mounting plate and having said cylindrical portion of said sleeve member and the socket housing extending therethrough;

a spring retaining member having a circumferential recessed area disposed on one side thereof, said spring retaining member also having said socket housing extending therethrough;

a helical spring disposed about said socket housing and intermediate said washer and said spring retaining member; and a split spring washer disposed adjacent the opposed side of said spring retaining member and secured to said socket housing, said split spring washer being operative to maintain the elements of the self-aligning fuel nozzle assembly in a single unit and to mount said assembly to the combustor liner of the engine;

a swirler member constructed with an elongated body having a radially extending swirler portion extending from one end and a spherically shaped ball portion extending from the opposite end thereof, said swirler member being mounted in the socket housing with its ball portion engaging the spherical socket for movement in a ball and socket relation; said elongated body portion having an axially extending aperture adapted to receive the fuel nozzle; and a fuel nozzle including an elongated cylindrical body extending from and mounted at one end to the combustor housing of the engine, said fuel nozzle slidably received within the aperture of the swirler member and having means to engage the swirler member to limit the relative movement between said fuel nozzle and said swirler member.

2. A self-aligning fuel nozzle assembly as recited in claim 1 wherein each said mounting plate includes a plurality of circular apertures circumferentially spaced and disposed at a distance from said centrally located, axially aligned aperture, each said mounting plate further including a plurality of radial slits therein, each said radial slit extending between said central aperture and each of said circumferentially spaced circular apertures.

3. A self-aligning fuel nozzle assembly as recited in claim 1 wherein the longitudinally extending interior opening of the tubular socket housing includes a constant diameter portion extending from one end thereof to a point intermediate the length thereof, and a sphersidal section extending from said intermediate point to the opposed end thereof and defining said spherical socket, said tubular socket housing further including a raised edge portion at said opposed end thereof.

4. A self-aligning fuel nozzle assembly as recited in claim 3 wherein said spheroidal section of said interior opening within said tubular socket housing further includes:

a plurality of circumferentially spaced longitudinal grooves disposed adjacent said section of constant diameter and extending to an intermediate point along the length of said spheroidal section;

a circumferential rectangular recessed area disposed adjacent said circumferential longitudinal grooves, with said grooves communicating therewith and extending to said raised edge portion in said opposed end of the socket housing; and a plurality of circumferentially spaced longitudinal apertures extending through said raised edge portion and spaced in alignment with said longitudinal grooves thereby defining passages for the flow of air such that air flows through the socket housing around said ball portion of the swirler member, and thence out through said longitudinal apertures in said raised edge portion for cooling the swirler portion of the swirler member at the base thereof.

5. A self-aligning fuel nozzle assembly mounted within the entrance opening in the combustor liner of a combustion chamber assembly of a gas turbine engine for maintaining the alignment of a swirler and a fuel nozzle throughout changes in the relative position of a combustor liner with respect to the combustor housing during operation of the engine comprising:

a swirler member including an elongated body having a radially extending swirler portion extending from one end and a spherical ball portion extending from the opposed end thereof, said swirler member having a plurality of circumferentially spaced apertures therethrough disposed intermediate said swirler portion and said ball portion, said swirler member having a longitudinally extending aperture for slidably receiving the fuel nozzle therein;

a tubular socket housing including a radially extending raised edge portion extending from one end thereof and a rectangular groove portion disposed adjacent the opposed end thereof, said tublar socket housing further including a longitudinally extending interior opening of irregular cross-section including a first section having a constant diameter and extending from said rectangular groove to a point intermediate the length thereof, and a second spheroidal section extending from said intermediate point to the raised edge portion, said spheroidal second section defining a socket member for receiving the ball portion of the swirler to form a ball and socket joint between the swirler member and said socket housing;

first and second mounting plates disposed at the inner and outer surfaces of the combustor liner, each plate having a centrally located aperture therein, said first and second mounting plates being secured together with said central apertures being in register;

a sleeve member including an elongated cylindrical portion having a cross-sectional diameter smaller than the cross-sectional diameter of said registering apertures, and with said elongated cylindrical portion extending through the aperture in the second mounting plate, and a radially extending lip portion extending from one end thereof having a cross-sectional diameter greater than the cross-sectional diameter of said registering apertures, said lip portion being disposed intermediate and in slidable relation to said first and second mounting plates such that the latter retains said sleeve member in a manner permitting motion of the sleeve member in two directions in the plane defined by said first and second mounting plates, said sleeve member further including a longitudinally extending aperture adapted to slidably receive said socket housing;

a washer disposed adjacent to said second mounting plate and having said cylindrical portion of said sleeve member and the socket housing extending therethrough;

a spring retaining member having a circumferential recessed area disposed on one side thereof, said spring retaining member also having said socket housing extending therethrough;

a helical spring disposed about said socket housing and intermediate said washer and said spring retaining member;

a split spring washer disposed adjacent the opposed side of said spring retaining member and within said rectangular groove portion of the socket housing, said split spring washer being operative to maintain the elements of the self-aligning fuel nozzle assembly as a single unit and to mount said assembly to the combustor liner of the engine; and a fuel nozzle including an elongated cylindrical body extending from and mounted at one end to the combustor housing of the engine, said fuel nozzle having a stepped portion disposed intermediate its length and a nozzle portion designed to aspirate fuel at the opposed end thereof, said fuel nozzle extending as a free body through the interior of the socket housing and into the central aperture of the swirler member for mixing of fuel and air therein, with said swirler member resting on and being biased against the step of the fuel nozzle by said helical spring; whereby said fuel nozzle assembly has a plurality of degrees of freedom for minimizing wear in the swirler and fuel nozzle, and promoting improved fuel economy of the engine.

6. A self-aligning fuel nozzle assembly as recited in claim 5 wherein said socket housing is formed of two mirror image parts to facilitate the engagement of said ball portion of the swirler member therein.

7. A self-aligning fuel nozzle assembly as recited in claim 5 wherein said first and second mounting plates are secured together by rivets.

8. A self-aligning fuel nozzle assembly as recited in claim 5 wherein said first and second mounting plates include a plurality of circumferentially spaced apertures and a plurality of radial slits therein, each said radial slit being disposed between said central aperture and each of said circumferentially spaced apertures.

9. A self-aligning fuel nozzle assembly as recited in claim 9 wherein said second spherical section of said interior opening within said tubular socket housing further includes:

a plurality of circumferentially spaced longitudinal grooves disposed adjacent said first section of constant diameter and extending to an intermediate point along the length of said spherical second section;

a circumferential rectangular recessed area disposed adjacent said longitudinal grooves, with said grooves communicating therewith and extending to said raised edge portion of the socket housing; and a plurality of circumferentially spaced longitudinal apertures extending through said raised edge portion and spaced in alignment with said longitudinal grooves, thereby defining passage for the flow of cool air such that air flows through the socket housing around said ball portion of the swirler member and into said circumferential grooves and recessed area, and thence out through said longitudinal apertures for cooling the swirler member along the base thereof.

* * * * *

UNITED STATES PATENT AND TRADEMARK OFFICE
CERTIFICATE OF CORRECTION

PATENT NO.   : 4,454,711
DATED        : June 19, 1984
INVENTOR(S)  : Avi Ben-Porat It is certified that error appears in the above-identified patent and that said Letters Patent are hereby corrected as shown below:

Column 12, line 11, please change "claim 9" to ---claim 5---.

Signed and Sealed this

Sixteenth Day of October 1984

[SEAL]

Attest:

Attesting Officer

GERALD J. MOSSINGHOFF

Commissioner of Patents and Trademarks